United States Patent
Oyama et al.

(10) Patent No.: US 9,899,709 B2
(45) Date of Patent: Feb. 20, 2018

(54) PRODUCTION METHOD FOR NON-AQUEOUS ELECTROLYTE SECONDARY BATTERY, AND NON-AQUEOUS ELECTROLYTE SECONDARY BATTERY

(75) Inventors: Yutaka Oyama, Toyota (JP); Yukihiro Okada, Shijonawate (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 414 days.

(21) Appl. No.: 14/370,320

(22) PCT Filed: Jan. 20, 2012

(86) PCT No.: PCT/JP2012/051232
§ 371 (c)(1),
(2), (4) Date: Nov. 19, 2015

(87) PCT Pub. No.: WO2013/108396
PCT Pub. Date: Jul. 25, 2013

(65) Prior Publication Data
US 2016/0087315 A1    Mar. 24, 2016

(51) Int. Cl.
| | |
|---|---|
| H01M 4/505 | (2010.01) |
| H01M 10/42 | (2006.01) |
| H01M 4/525 | (2010.01) |
| H01M 10/0567 | (2010.01) |
| H01M 10/0587 | (2010.01) |

(Continued)

(52) U.S. Cl.
CPC ....... *H01M 10/4235* (2013.01); *H01M 2/345* (2013.01); *H01M 4/366* (2013.01); *H01M 4/505* (2013.01); *H01M 4/525* (2013.01); *H01M 4/624* (2013.01); *H01M 10/049* (2013.01); *H01M 10/0481* (2013.01); *H01M 10/052* (2013.01); *H01M 10/0567* (2013.01); *H01M 10/0587* (2013.01); *H01M 10/446* (2013.01); *H01M 2200/20* (2013.01); *H01M 2220/20* (2013.01);

(Continued)

(58) Field of Classification Search
CPC ..... H01M 10/446; H01M 2/345; H01M 4/624
See application file for complete search history.

(56) References Cited

U.S. PATENT DOCUMENTS

| | | | | |
|---|---|---|---|---|
| 2003/0031923 A1* | 2/2003 | Aoshima | ............... | H01M 2/021 429/127 |
| 2004/0259002 A1* | 12/2004 | Kim | .................. | H01M 10/0525 429/326 |

(Continued)

FOREIGN PATENT DOCUMENTS

JP    2008-103330    5/2008

*Primary Examiner* — Jeremiah R Smith
(74) *Attorney, Agent, or Firm* — Finnegan, Henderson, Farabow, Garrett & Dunner, LLP

(57) ABSTRACT

A production method for non-aqueous electrolyte secondary batteries includes a conditioning process in which an electrode group having a positive electrode and a negative electrode wound by interposing a separator therebetween is inserted inside a case a non-aqueous electrolyte including an overcharge additive is injected and the case is sealed, after which a restraining pressure is applied to the case, and charge/discharge is performed at least once. After initial charging in the conditioning process, a fracture portion is formed in secondary particles of a positive electrode active material, and then a conductive coating is formed on the fracture portion.

3 Claims, 7 Drawing Sheets

(51) Int. Cl.
*H01M 4/62* (2006.01)
*H01M 10/44* (2006.01)
*H01M 2/34* (2006.01)
*H01M 4/36* (2006.01)
*H01M 10/04* (2006.01)
*H01M 10/052* (2010.01)

(52) U.S. Cl.
CPC .............. *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2008/0090153 A1 | 4/2008 | Kim et al. |
| 2009/0202900 A1* | 8/2009 | Kuroda ................. H01G 9/06 429/156 |
| 2010/0255359 A1* | 10/2010 | Hirakawa ............... H01M 2/12 429/120 |
| 2011/0212362 A1* | 9/2011 | Miyamori ........... H01M 2/1653 429/188 |

* cited by examiner

PRODUCTION METHOD FOR NON-AQUEOUS ELECTROLYTE SECONDARY BATTERY, AND NON-AQUEOUS ELECTROLYTE SECONDARY BATTERY

CROSS-REFERENCE TO RELATED APPLICATIONS

This is a US national phase application based on the PCT International Patent Application No. PCT/JP2012/051232, filed Jan. 20, 2012, the entire contents of which are incorporated herein by reference.

TECHNICAL FIELD

The present invention relates to a method for producing a non-aqueous electrolyte secondary battery to be mounted in a vehicle, and the non-aqueous electrolyte secondary battery produced by the method.

BACKGROUND ART

Since lithium ion secondary batteries have high energy density per unit weight and are rapidly chargeable, these batteries have recently been studied and developed as drive power sources of electric cars and hybrid cars. As a positive active material of those lithium ion secondary batteries, there is used lithium metal oxide (e.g., NCM (LiNiCoMnO$_2$)) capable of reversibly absorbing and releasing lithium ions. The lithium metal oxide is generally low in electron conductivity. Thus, a positive electrode plate/sheet is produced in such a manner that a paste-like coating solution prepared by mixing the above positive active material, a conductive material (e.g., AB (acetylene black)), and a binder (e.g., PVDF (polyvinylidene fluoride)) with a solvent is applied to a metal foil, and then dried and pressed.

Furthermore, the non-aqueous electrolyte solution of the lithium ion secondary batteries includes an organic solvent which is flammable. In terms of safety enhancement with respect to thermal runway, the electrolyte solution contains an overcharge additive which generates gas during overcharge (for example, CHB (cyclohexyl benzene) and BP (biphenyl) and so on) (see Patent Document 1).

RELATED ART DOCUMENTS

Patent Documents

Patent Document 1: JP-A-2008-103330

SUMMARY OF INVENTION

Problems to be Solved by the Invention

However, when the lithium ion secondary battery is subjected to a cycle endurance test that repeats charge and discharge, the positive active material expands and contracts, thereby causing a contact failure between the conductive material and the positive active material. In case the contact failure occurs between the conductive material and the positive active material, a conductive path allowing electrical conduction from the outer surface of the positive active material to a negative active material through the conductive material is decreased and thus a capacity retention rate and an efficiency of generating gas during overcharge ("overcharge gas") are deteriorated.

The positive active material is produced by crushing a burned object consisting of a number of primary particles aggregated into a shape like a rice crispy or puff ("Kaminari Okoshi" in Japanese), each of the primary particles being made of lithium metal oxide and each having a diameter of about several tens to several hundreds nm. The "rice crispylike shape" means a state of a number of fine or micro particles stereoscopically aggregated by expanding within an enclosed space and bonded to one another with particle surfaces closely contacting one another while leaving some voids therebetween. Accordingly, it is conceived that a secondary particle of the positive active material is formed of the primary particles bonded at crystal grain boundaries therebetween by physical stress caused by crystal growth of the primary particles mainly during burning.

In a case where the cycle endurance test is performed, therefore, expansion/contraction stress resulting from charge and discharge acts on the crystal grain boundaries between the primary particles. Thus, each secondary particle of the positive active material is broken or fractured (including "cracked", the same shall apply hereinafter) from each crystal grain boundary between the primary particles having weak bonding force. Miniaturization is thus advanced. The fracture portion is an intrinsic surface which has high chemical activity and low conductivity. This portion cannot form a conductive path to a negative electrode unless a conductive material is present thereon and thus cannot contribute to generation of overcharge gas from the negative electrode even in an overcharge state.

As a method for addressing the above problems, it is conceivable to increase the proportion or ratio of the conductive material in advance to increase the number of contact points between the conductive material and the positive active material. However, this method is not a best way because of a large departure such as a drawback to enhancement of energy density.

The present invention has been made in view of the circumstances to solve the above problems and has a purpose to provide a method for producing a non-aqueous electrolyte secondary battery capable of efficiently generating overcharge gas while suppressing capacity degradation even after a cycle endurance test, and the non-aqueous electrolyte secondary battery produced by the method.

Means of Solving the Problems (1) To achieve the above purpose, one aspect of the invention provides a method for producing a non-aqueous electrolyte secondary battery, the method including: inserting an electrode group having a positive electrode and a negative electrode wound by interposing a separator therebetween into a case; injecting a non-aqueous electrolyte solution containing an overcharge additive and hermetically closing the case; and then performing a conditioning process to charge and discharge the battery at least once or more while applying restraining pressure to the case, wherein the conditioning process includes forming a fracture portion in secondary particles of a positive active material after initial charge, and further forming a conductive coating on the fracture portion. Herein, the term "fracture portion" represents a surface separated from a bonding state at a crystal grain boundary and includes a partially separated (corresponding to cracked) surface.

(2) In the method for producing a non-aqueous electrolyte secondary battery described in (1), preferably the fracture portion is formed by setting the restraining pressure to a lower pressure than normal restraining pressure and performing overdischarge at a high rate.

(3) In the method for producing a non-aqueous electrolyte secondary battery described in (1) or (2), preferably, the conductive coating is formed by setting the restraining pressure to a lower pressure than normal restraining pressure, performing recharge at a low rate, and raising an upper limit potential during the recharge to a decomposition potential of the overcharge additive.

(4) In the method for producing a non-aqueous electrolyte secondary battery described in one of (1) to (3), preferably, after the conductive coating is formed, the restraining pressure is set to normal restraining pressure and redischarge is performed at a low rate.

(5) In the method for producing a non-aqueous electrolyte secondary battery described in one of (1) to (4), preferably, the secondary particles of the positive active material has an average particle diameter of about 4 μm or more.

(6) Another aspect of the invention to achieve the above purpose provides a non-aqueous electrolyte secondary battery produced by the non-aqueous electrolyte secondary battery producing method described in one of (1) to (5), wherein the positive active material is ternary lithium oxide containing nickel, cobalt, and manganese, and the conductive coating contains a component derived from cyclohexyl benzene or biphenyl, (7) The non-aqueous electrolyte secondary battery described in (6) preferably includes a pressure-type current interrupt mechanism.

Effects of the Invention

The non-aqueous electrolyte secondary battery of the present invention having the above configurations can provide the following operations and advantageous effects.

(1) One aspect of the invention described in (1) provides a method for producing a non-aqueous electrolyte secondary battery, the method including: inserting an electrode group having a positive electrode and a negative electrode wound by interposing a separator therebetween into a case; injecting a non-aqueous electrolyte solution containing an overcharge additive and hermetically closing the case; and then performing a conditioning process to charge and discharge the battery at least once or more while applying restraining pressure to the case, wherein the conditioning process includes forming a fracture portion in secondary particles of a positive active material after initial charge, and further forming a conductive coating on the fracture portion. Accordingly, in the conditioning process performed after production of a secondary battery, the secondary particles of the positive active material are intentionally fractured and conductivity is imparted to the fracture portions. This can efficiently generate overcharge gas while suppressing capacity degradation even after a cycle endurance test.

Specifically, in the conditioning process, the fracture portion is formed in secondary particles of the positive active material after initial charge, so that the primary particles having a weak mutual bonding force can be divided or separated by the fracture portions. Since the primary particles are divided by the fracture portions, the influence of expansion and contraction during the cycle endurance test can be reduced and can suppress the possibility of contact failures between the conductive material and the positive active material.

Furthermore, since the fracture portion is formed with a conductive coating, it is possible to avoid energy density decrease due to an increased proportion of the conductive material and also to form a conductive path allowing electrical conduction from the fracture portion to the negative active material through the conductive coating. This can efficiently generate overcharge gas. Moreover, by forming the fracture portions in the secondary particles of the positive active material, the size of the secondary particles is miniaturized. Since this miniaturization is performed after initial charge, the suitable size of the secondary particles to coating can be ensured without decreasing a paste NV (a ratio of weight of a mixture after drying) during coating. Accordingly, there can be provided the method for producing a non-aqueous electrolyte secondary battery to efficiently generate overcharge gas while suppressing capacity degradation even after the cycle endurance test.

(2) In the method for producing a non-aqueous electrolyte secondary battery described in (1), the fracture portion is formed by setting the restraining pressure to a lower pressure than normal restraining pressure and performing overdischarge at a high rate. It is possible to positively utilize changes (expansion and contraction) in axial length of a crystal structure associated with lithium absorption of the positive active material to prompt generation of secondary particle fracture. Specifically, the restraining pressure applied to the case is set to be lower than normal restraining pressure, thereby increasing the degree of freedom of the secondary particles of the positive active material to allow easy changes (expansion and contraction) of crystal faces. High-rate discharging causes the primary particles forming each secondary particle to rapidly change (expand and contract) crystal faces. This can easily start fracturing from a crystal grain boundary between the primary particles having a weak bonding force.

Due to overdischarge, a lowest potential during discharge is a potential lower than or equal to a lower limit potential in a normal use range. Accordingly, lithium in the secondary particles tends to be absorbed more than during normal discharge. As a lithium amount in the secondary particles is increased, the axial length of each crystal structure is more largely changed (expanded and contracted), enabling more easy generation of fracture. In the conditioning process performed after production of the secondary battery, the fracture of the secondary particles of the positive active material can be induced positively and effectively.

Herein, when the normal restraining pressure is set to be on the order of 450 to 500 kPa, the restraining pressure is further preferred to set to be on the order of 30 to 40% of the normal restraining pressure. A current rate is more preferably 2C or higher. The lowest potential during discharge is further preferably set to be about ⅔ (e.g., about 2V) of a lower limit potential (about 3V) in the normal use range.

(3) In the method for producing a non-aqueous electrolyte secondary battery described in (1) or (2), the conductive coating is formed by setting the restraining pressure to a lower pressure than normal restraining pressure, performing recharge at a low rate, and raising an upper limit potential during the recharge to a decomposition potential of the overcharge additive. An electrolyte solution is allowed to go between the intrinsic surfaces of the fracture portions generated by the secondary particle fracturing of the positive active material and to newly form the conductive coating thereon.

Specifically, since the restraining pressure is set to be lower than the normal restraining pressure, gaps can be provided between the intrinsic surfaces of the fracture portions generated by fracturing of the secondary particles, so that the electrolyte solution containing the overcharge additive can get into the gaps. Further, recharge at a low rate allows preventing deterioration of the intrinsic surfaces. Since the upper limit potential during recharge is raised to a decomposition potential of the overcharge additive, the components of the decomposed overcharge additive come into close contact with the intrinsic surfaces, thereby facilitating formation of the conductive coating. In this case, the conductive coating sticks to the primary particles and thus good cycle durability is achieved. Furthermore, since the conductive coating grows in the form of particles into a porous coating, this coating does not impede diffusion of the electrolyte solution. The effective specific surface area (BET) including the intrinsic surfaces of the primary particles is high and thus the battery resistance can be kept down.

Each of the gaps generated between the intrinsic surfaces of the fracture portions is on the order of several hundreds nm. It is therefore difficult for the conductive material such as AB (acetylene black) arranged like a string of beads to get into the gaps. Accordingly, even if the amount of the conductive material is increased, the conductive path cannot be formed in the miniaturized and divided primary particles. Thus, the intrinsic surface of the fracture portion generated by the secondary particle fracturing cannot be effectively utilized.

Accordingly, in the conditioning process performed after production of the secondary battery, the conductive coating derived from the decomposed overcharge additive is formed in the fracture portion generated by the secondary particle fracturing of the positive active material, so that the capacity degradation can be further suppressed even after the cycle endurance test and the overcharge gas can be more efficiently generated.

(4) In the method for producing a non-aqueous electrolyte secondary battery described in one of (1) to (3), after the conductive coating is formed, the restraining pressure is set to normal restraining pressure and redischarge is performed at a low rate. This can remove the gas generated when the surface coating generally called SEI is formed on the negative active material surface and the gas generated when the overcharge additive is decomposed, and others. Since these gases are removed in the conditioning process performed after production of the secondary battery, the capacity retention rate after the cycle endurance test can be enhanced.

(5) In the method for producing a non-aqueous electrolyte secondary battery described in one of (1) to (4), the secondary particles of the positive active material has an average particle diameter of about 4 µm or more. The average particle diameter of the secondary particles of the positive active material is about 4 µm or more. This can suppress deterioration in capacity retention rate after the cycle endurance test even in a secondary battery of a high energy density type having a less amount of conductive material. According to experiments conducted by the inventors, specifically, it is found that the average particle diameter of secondary particles being about 4 µm or more enables suppressing deterioration in capacity retention rate after the cycle endurance test by forming the conductive path even when the conductive material (e.g., AB) is about 6 weight %. Herein, the particle diameter of secondary particles can be determined by area conversion of an SEM photograph.

(6) In the method for producing a non-aqueous electrolyte secondary battery described in one of (1) to (5), the positive active material is ternary lithium oxide containing nickel, cobalt, and manganese, and the conductive coating contains a component derived from cyclohexyl benzene or biphenyl. This can provide at low cost the non-aqueous electrolyte secondary battery of a high energy density type having a less amount of conductive material, the battery being capable of efficiently generating overcharge gas while suppressing capacity degradation after the cycle endurance test.

(7) The non-aqueous electrolyte secondary battery described in (6) includes a pressure type current interrupt mechanism, whereby a charge current can be reliably interrupted in case overcharge gas occurs.

MODE FOR CARRYING OUT THE INVENTION

A detailed description of a preferred embodiment of a method for producing a non-aqueous electrolyte secondary battery and the non-aqueous electrolyte secondary battery according to the invention will now be given referring to the accompanying drawings. The producing method in the present embodiment includes inserting an electrode group that includes a positive electrode and a negative electrode wound by interposing separators therebetween into a case, injecting a non-aqueous electrolyte solution containing an overcharge additive into the case, hermetically closing the case, and then performing a conditioning process to charge and discharge a battery at least once or more while the case is being under restraining pressure. Herein, the conditioning process which is a feature of the invention will be mainly explained.

<Production of a Non-Aqueous Electrolyte Secondary Battery>

Figure 1:
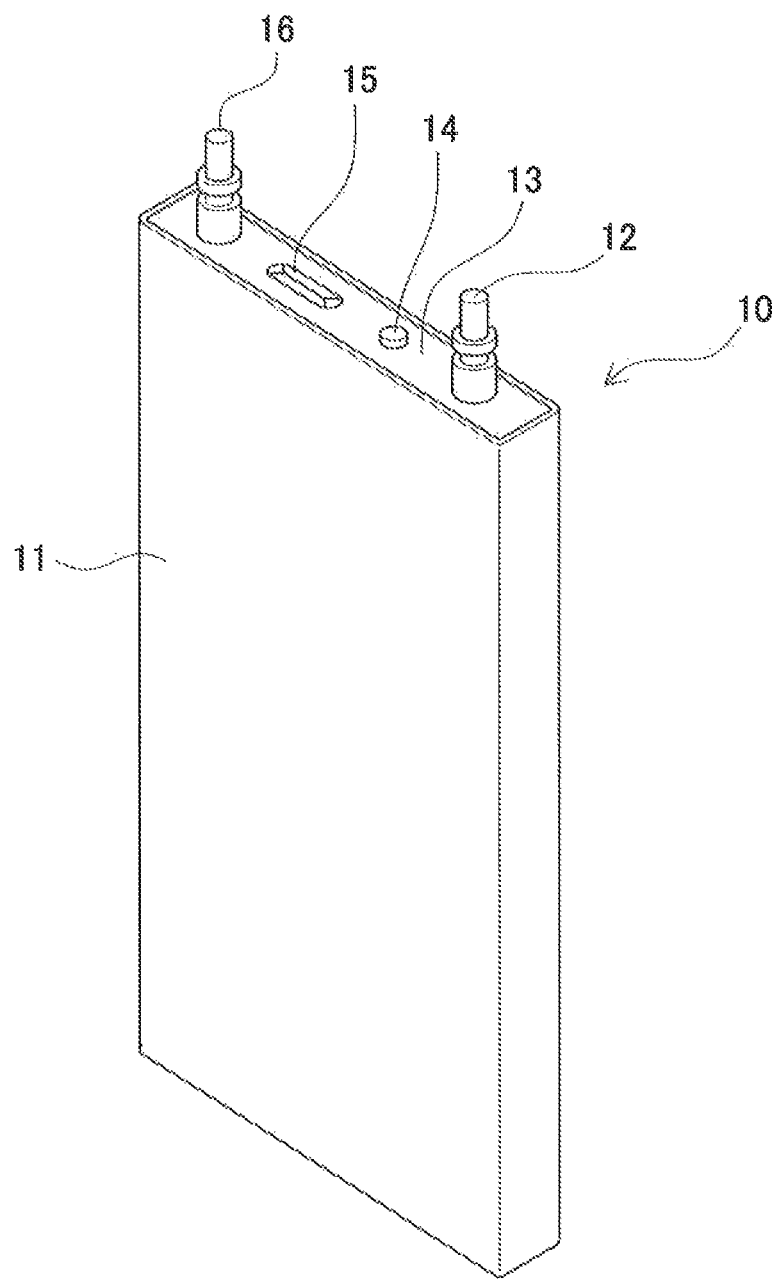
FIG. 1 is a perspective view of a non-aqueous electrolyte secondary battery in an embodiment of the invention.

A method for producing a non-aqueous electrolyte secondary battery according to the invention will be first briefly explained. FIG. 1 is a perspective view of the non-aqueous electrolyte secondary battery in the present embodiment.

As shown in FIG. 1, a non-aqueous electrolyte secondary battery 10 is produced by inserting an electrode group including a positive electrode and a negative electrode laminated by interposing separators therebetween and wound together in a long oval shape into a rectangular case 11, and joining an upper lid 13 to an upper end of the case 11 to hermetically close the case 11. The upper lid 13 is provided with a positive terminal 12 and a negative terminal 16 vertically extending while being connected with the electrode group. Between the both terminals, there are arranged a safety valve 15 and a liquid inlet 14. A non-aqueous electrolyte solution is injected through the liquid inlet 14, and then the liquid inlet 14 is closed by a screw member. The safety valve 15 is a valve for releasing gas generated in the case 11.

The positive electrode is produced by kneading a positive active material, a conductive material, and a binder with an organic solvent to prepare a paste, applying this paste to a metal foil, and then drying and pressing the foil. NCM is used as the positive active material, AB is used as the conductive material, and PVDF is used as the binder. The negative electrode is produced by kneading a negative active material, a thickener, and a binder with a water-based solvent to prepare a paste, applying this paste to a metal foil, and then drying and pressing this foil. Graphite is used as the negative active material, CMC (carboxymethylcellulose) is used as the thickener, and SBR (styrene-butadiene rubber) is used as the binder. The non-aqueous electrolyte solution is prepared by mixing the overcharge additive into the organic electrolyte solution. As the overcharge additive, CHB and BP are used. The non-aqueous electrolyte secondary battery 10 is connected to a current interrupt mechanism (a pressure-type current interrupt mechanism) to interrupt a charge current by gas pressure generated during overcharge.

<Conditioning Step>

Figure 2:
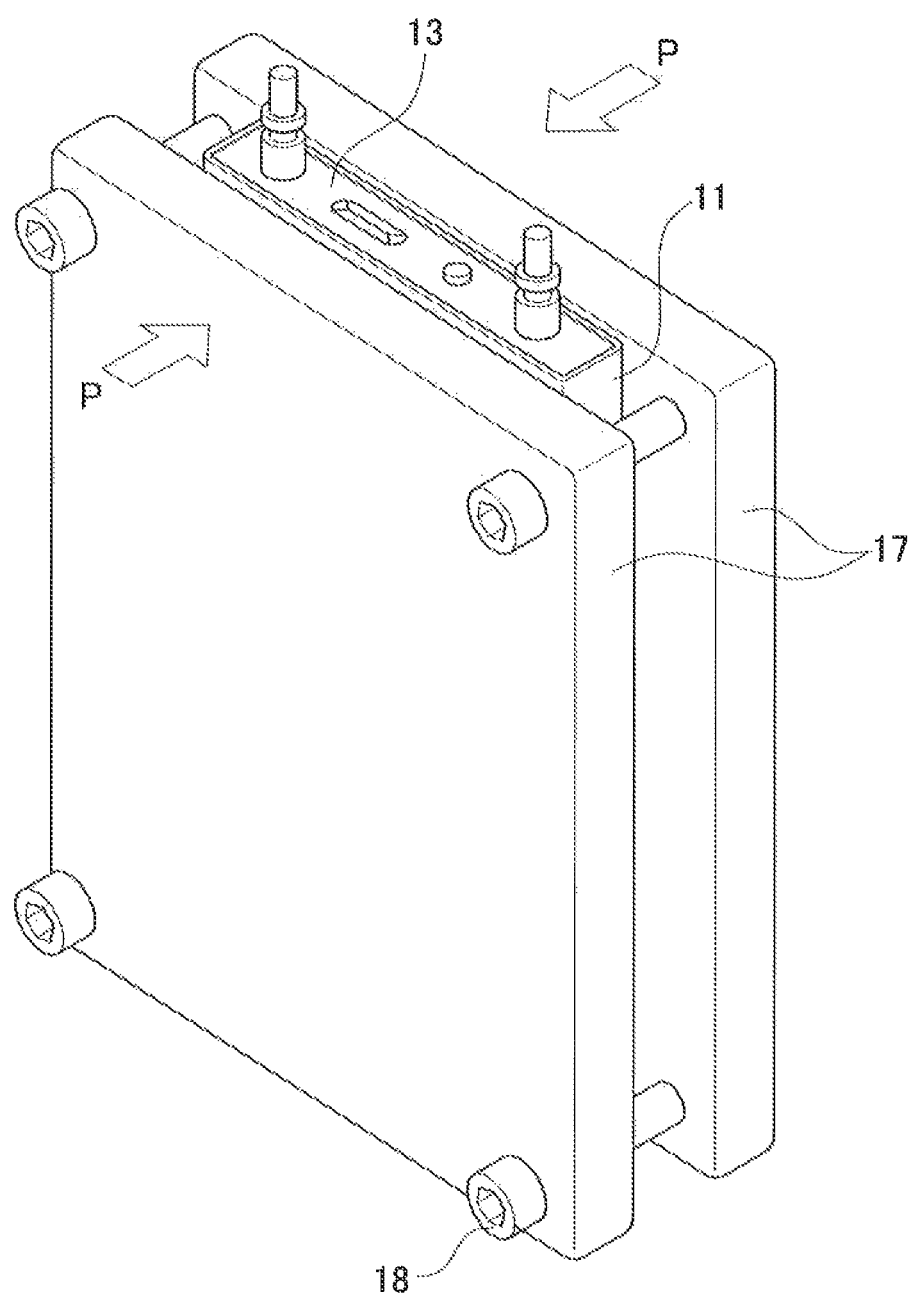
FIG. 2 is a perspective view showing a state in which restraining pressure is applied to the non-aqueous electrolyte secondary battery shown in FIG. 1 in a conditioning process.
Figure 3:
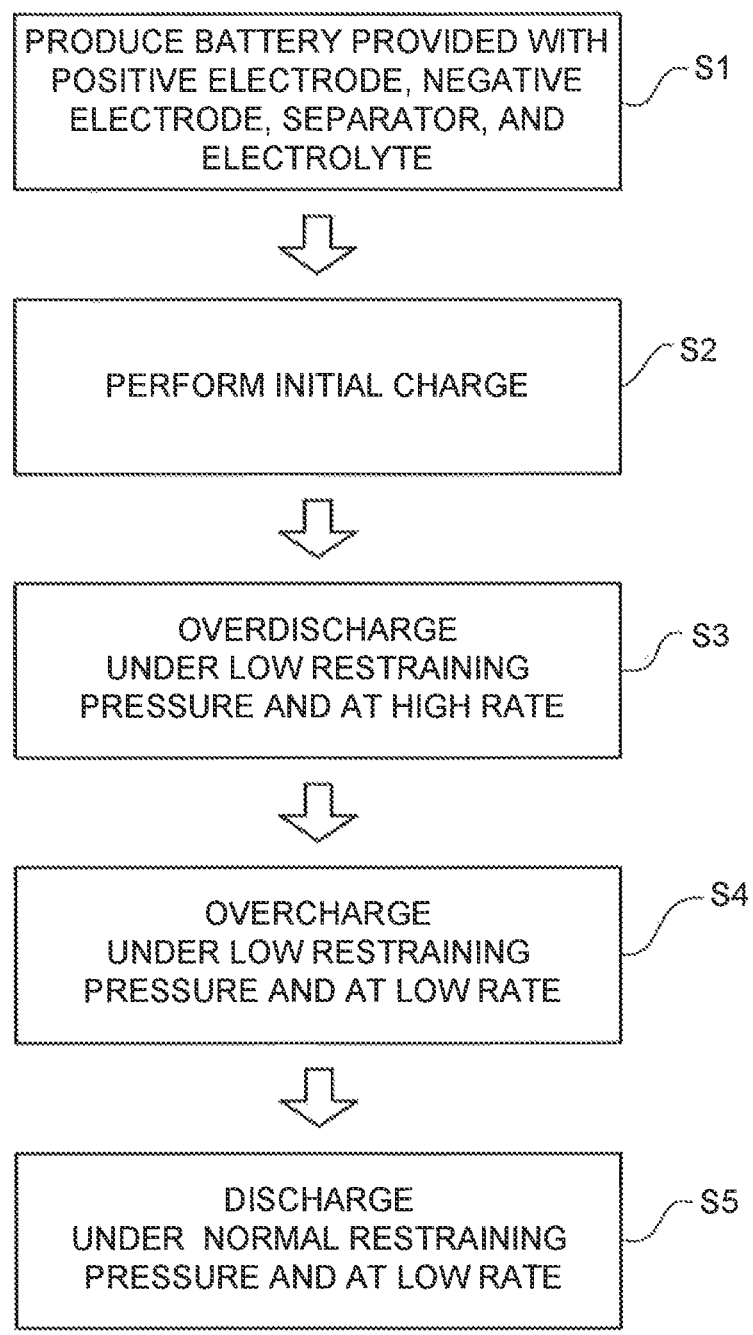
FIG. 3 is a flow chart showing the conditioning process of the non-aqueous electrolyte secondary battery shown in FIG. 1.
Figure 4:
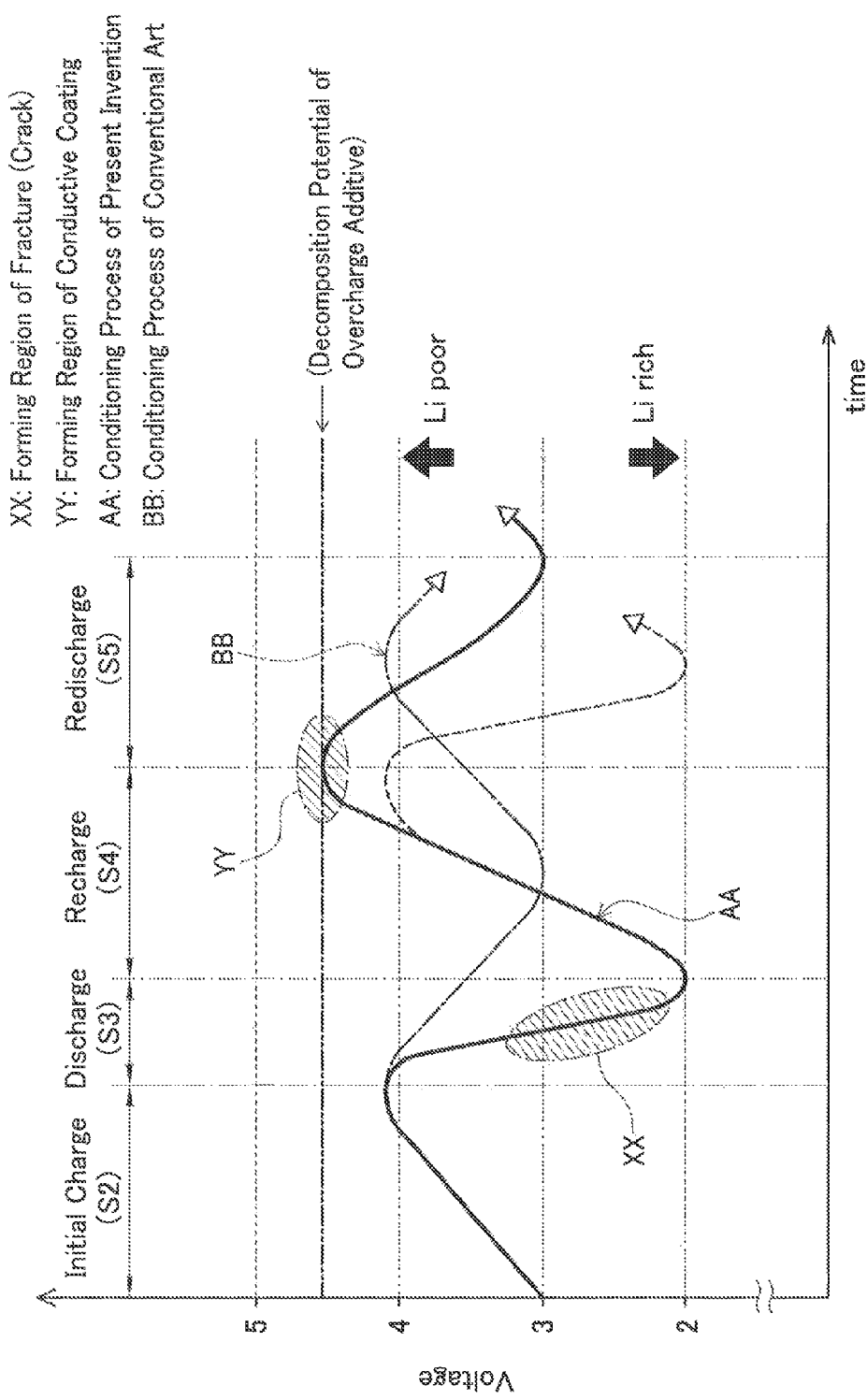
FIG. 4 is a voltage characteristic pressure in the conditioning process shown in FIG. 3.

The following explanation will be given to the conditioning process of the non-aqueous electrolyte secondary battery in the present embodiment. FIG. 2 is a perspective view showing a state where restraining pressure is applied in the conditioning process of the non-aqueous electrolyte secondary battery shown in FIG. 1. FIG. 3 is a flowchart in the conditioning process of the non-aqueous electrolyte secondary battery shown in FIG. 1. FIG. 4 is a voltage characteristic graph in the conditioning process shown in FIG. 3.

As shown in FIG. 2, prior to the conditioning process of the non-aqueous electrolyte secondary battery 10, restraining plates 17 are placed to apply the restraining pressure from both side surfaces extending in a longitudinal direction of the case 11. Four corners of each restraining plate 17 are fastened with fastening tools 18 to enable adjustment of the restraining pressure at least from normal restraining pressure (on the order of 450 to 500 kPa) to a low pressure of on the order of 30% of the normal restraining pressure. Upon application of the restraining pressure, the case is slightly warped due to a hermetically closed state, increasing the internal pressure of the case, thereby also applying pressure to the active material coated on the electrode group. Accordingly, increasing and decreasing the restraining pressure allows adjustment of the degree of freedom of the positive active material and the negative active material to expand and contract during charge and discharge.

As shown in FIG. 3, the conditioning process of the non-aqueous electrolyte secondary battery 10 includes four steps (S2 to S5) following step S1 of producing a secondary battery including a positive electrode, a negative electrode, separators, and an electrolyte solution.

In step S2, the non-aqueous electrolyte secondary battery 10 is subjected to initial charge. As shown in FIG. 4, the initial charge is carried out under room temperatures from a discharge lower limit voltage, about 3.0 V, to a charge upper limit voltage, 4.1 V. The current rate at this time is 1C. The restraining pressure is on the order of 150 to 160 kPa corresponding to about 30% of the normal restraining pressure. The secondary particles of the positive active material each change in axial length of a crystal structure (each particle contracts along a certain axis and expands along another axis) when lithium is released by charge. However, since the restraining pressure is low, restrictions from adjacent active material particles are less, allowing secondary particles to more freely change (expand and contract).

In step S3, successively, overdischarge at low restraining pressure and at a high rate is performed. As shown in FIG. 4, overdischarge is carried out from the charge upper voltage, about 4.1 V, to an overdischarge voltage, about 2.0 V which is lower than the discharge lower limit voltage, about 3.0 V. At this time, the current rate is 2C. The restraining pressure is low as in step S2. Accordingly, the secondary particles of the positive active material absorb much lithium by overdischarge and thus largely change in axial length of each crystal structure (expand along a certain axis and contract along anther axis). Because of the low restraining pressure, restrictions from adjacent active material particles are less, allowing the secondary particles to more freely change (expand and contract). In the primary particles forming each secondary particle, distortion in each particle is remarkably increased by changes (expansion and contraction) of crystal faces of each crystal structure. This is likely to start fracturing from a crystal grain boundary between the primary particles having a weak bonding force. Since the current rate is 2C and a discharge speed is fast, the secondary particles of the positive active material rapidly change (expand and contract). This makes it easy for the secondary particles of the positive active material to form a fracture portion at the crystal grain boundary between the primary particles. The electrolyte solution goes between the fracture portions. To form more fracture portions in the secondary particles of the positive active material, charge and discharge in steps 2 to 3 may be repeated several times (a broken line in FIG. 4). For example, this repetition may be performed about three times or less.

In step 4, subsequently, overcharge under low restraining pressure and at a low rate is performed. As shown in FIG. 4, overcharge is carried out from the overdischarge voltage, about 2.0 V, to a decomposition potential of the overcharge additive BP, about 4.5 V which is equal to or higher than the charge upper limit voltage, about 4.1 V. At this time, the current rate at this time is 1C. The restraining pressure is low as in steps S2 to S3. Accordingly, the secondary particles of the positive active material release lithium by charge and thus change in axial length of each crystal structure. Because of the low restraining pressure, restrictions from the adjacent active materials are less, allowing the secondary particles to more freely change. This change increases the size of the gaps between the fracture portions, so that the electrolyte solution can easily get into the gaps. The electrolyte solution contains about 2 to 3 weight % of the overcharge additive BP. The overcharge is carried out up to the decomposition potential of the overcharge additive BP, about 4.5 V, so that the overcharge additive BP contained in the electrolyte solution is decomposed, eluting a part of the component, thereby forming a conductive coating on the intrinsic surface of the fracture portion. The conductive coating grows in the form of particles into a porous coating. This does not impede diffusion of the electrolyte solution. Since NCM of the positive active material has a high effective specific surface area (BET) including the intrinsic surfaces of the primary particles, the battery resistance can be kept down.

In step 5, discharge under normal restraining pressure and at a low rate is performed. As shown in FIG. 4, discharge is carried out from the decomposition potential of the overcharge additive BP, about 4.5 V, to the discharge lower limit voltage, about 3.0 V. The current rate at this time is 1C. Differently in steps S2 to 4, the restraining pressure is normal restraining pressure. Thus, the internal pressure of the case rises, thereby enabling removal of the gas generated when the surface coating generally called SEI is formed on the negative active material and the gas generated at the time of decomposition of the overcharge additive, and others.

<Fracture Portion and Conductive Coating in Positive Active Material>

Figure 5:
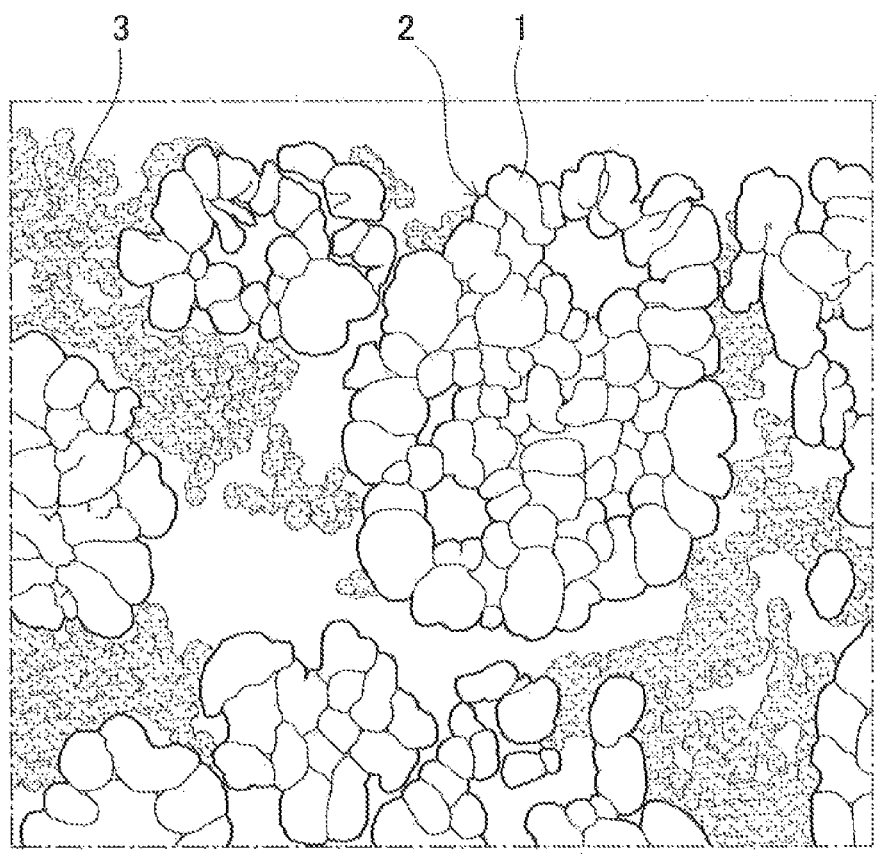
FIG. 5 is a schematic diagram showing a state of secondary particles before fracturing in a conditioning process shown in FIG. 3.
Figure 6:
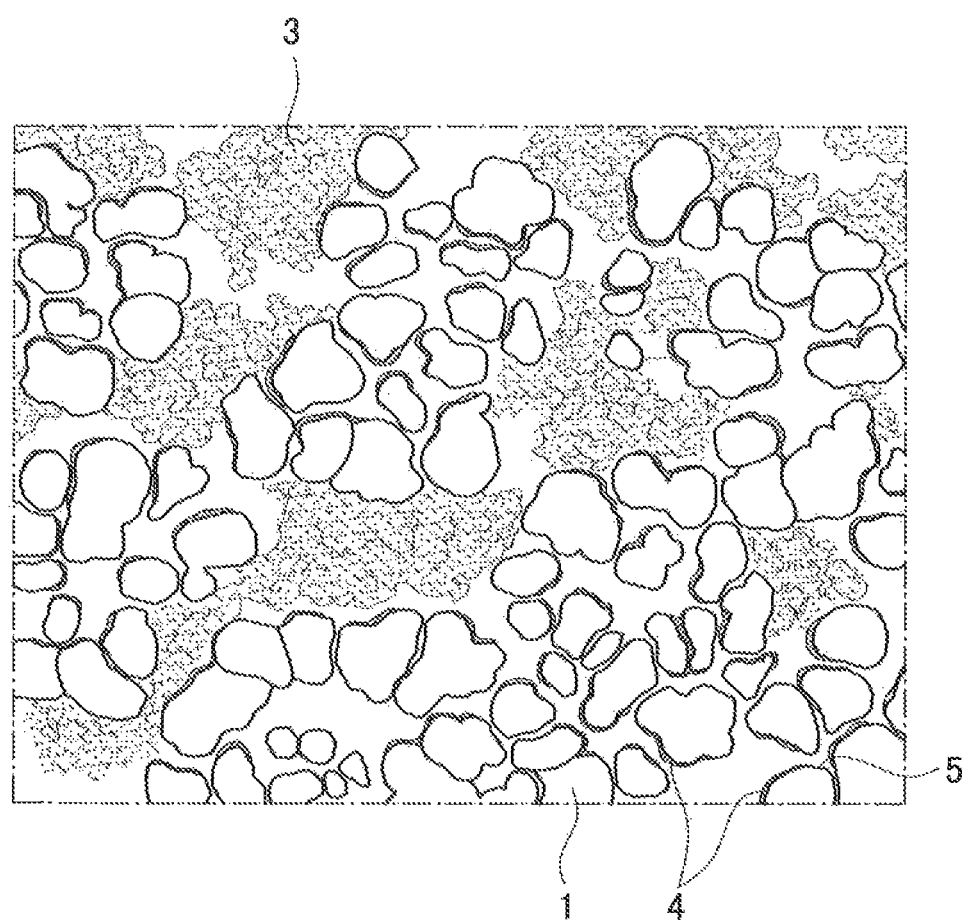
FIG. 6 is a schematic diagram showing a state of the secondary particles after fracturing in the conditioning process shown in FIG. 3.
Figure 7:
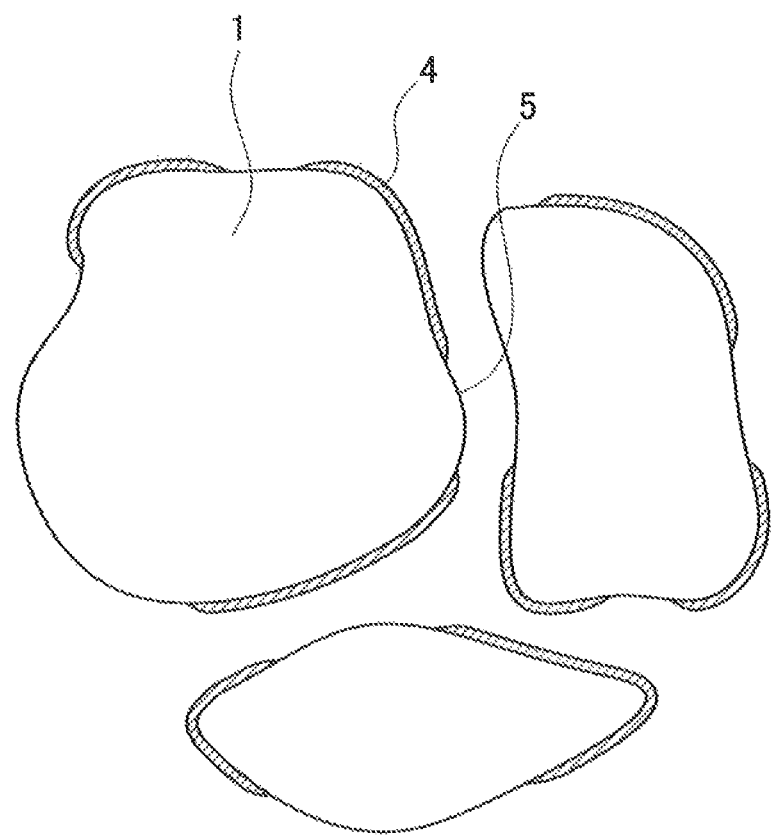
FIG. 7 is an enlarged schematic view of a fractured secondary particle shown in FIG. 6.

Next, the fracture portion and the conductive coating in the positive active material formed in steps 2 to 4 will be explained. FIG. 5 is a schematic diagram showing a state of the secondary particles before fracturing in the conditioning process shown in FIG. 3. FIG. 6 is a schematic diagram showing a state of the secondary particles after fracturing in the conditioning process shown in FIG. 4. FIG. 7 is an enlarged schematic diagram of a fractured secondary particle shown in FIG. 6.

As shown in FIG. 5, in the state of the secondary particles before fracturing generated in the steps 2 to 4, the secondary particles 2 of the positive active material each consist of a number of primary particles 1 which are single crystals made of lithium metal oxide having a diameter of on the order of several tens to several hundreds nm and aggregated and bonded to each other. The secondary particles 2 are coated with a mixture prepared by kneading the conductive material and the binder. Thus, the conductive material 3 continuous like a string of beads is present between the secondary particles. A part of the conductive material 3 contacts with the outer periphery of each secondary particle 2 and forms a conductive path with the negative active material through the electrolyte solution getting therein. In each secondary particle, a plurality of primary particles 1 are aggregated and bonded at crystal grain boundaries. Each secondary particle 2 may be internally formed with a hollow or void; however, this hollow or void has no contact point with the conductive material.

As shown in FIG. 6, the secondary particles 2 of the positive active material are formed with the secondary particle fractures in the steps 2 to 4 in the conditioning process and miniaturized into the primary particles 1 divided at the fracture portions 5. The gap generated between the fracture portions 5 is on the order of hundreds nm and thus it is difficult for the conductive material such as a string-of-beads structure of AB (acetylene black) to get into the gap. In contrast, the electrolyte solution is allowed to get into the gap and form the island-shaped conductive coatings 4 including the decomposed composition of the overcharge additive CHB/BP on the fracture portions 5. Each fracture portion 5 has a highly active intrinsic surface and therefore ensures close contact of the conductive coating to the fracture portion. The conductive coating 4 coats a part of each primary particle produced by separation and miniaturization by the fracture portions 5 as shown in FIG. 7. The conductive coating 4 forms the conductive path with the negative active material through the electrolyte solution entering between the fracture portions and also form a conductive path between the adjacent primary particles. Accordingly, the conductive coatings 4 thus formed can reduce the internal resistance value of the secondary battery.

According to the experimental results found by the inventors, in a case where the content of the conductive material (BP) is as small as about 6 weight % with respect to the positive active material, the capacity retention rate after the cycle endurance test tends to decrease as the secondary particles of the positive active material is smaller than about 4 μm in diameter. One of the reasons thereof is conceived that as the diameter of the secondary particles is smaller, the relative density of the conductive material with respect to the secondary particles 2 is lower and it is difficult to form a conductive path. Thus, when a secondary battery of a high density energy type having a less amount of conductive material is to be produced, the particle diameter of the secondary particles 2 is set to as relatively large as about 4 μm or more and then the fracture portions 5 are formed in the conditioning process of the present embodiment to miniaturize the secondary particles 2, and further the conductive coatings 4 are formed on the fracture portions 5. This can realize a high density energy type of a secondary battery without increasing the amount of the conductive material 3. The particle diameter of the secondary particles 2 is however limited by a coating thickness of a positive electrode mixture. For instance, for the coating thickness of a coating is on the order of 50 to 80 μm, the particle diameter of the secondary particles 2 is preferably set to about 30 μm or less. This is because when the particle diameter of the secondary particles 2 exceeds about the 30 μm, the distribution density of the secondary particles 2 in the coating becomes non-uniform.

EXAMPLES AND COMPARATIVE EXAMPLES

Next, Example 1 concretely embodying the present embodiment and Comparative examples 1 to 6 are produced and their evaluation results are explained.

Example 1

Example 1 is produced as below. The positive active material used herein is NCM111 (Li/Me=1.05). The diameter of the secondary particles of the positive active material is about 6 μm. The diameter of the primary particles is about several hundreds nm. The conductive material is DENKA® black powder (AB), the binder is PVDF (#7300 by Kureha Chemical Industry Co., Ltd.), A weight ratio of NCM:AB:PVDF is 93:4:3(%). A positive mixture at this ratio is kneaded with an organic solvent NMP to prepare a paste. NV (a weight ratio of the mixture after drying) of the paste is about 70%. This paste is applied to an aluminum foil and dried to obtain a positive electrode weight per unit area of about 30 mg/cm$^2$ and a mixture density of about 2.8 g/cc, and subjected to pressing. A positive electrode sheet is thus produced.

The negative active material used herein is graphite. The thickener is CMC and the binder is SBR. A weight ratio of graphite:CMC:SBR is 98:1:1(%). A negative electrode mixture at this rate is kneaded with a water-based solvent to prepare a paste. This paste is applied to a copper foil and dried to obtain a negative electrode weight per unit area of about 17 mg/cm$^2$ and a mixture density of about 1.4 g/cc, and subjected to press. Thus, a negative electrode sheet is produced.

An electrode group is formed by laminating the positive electrode sheet and the negative electrode sheet by interposing therebetween separators each having micropores allowing passage of lithium ions, winding and flattening this lamination, and inserting this wound body in a rectangular tubular case. The upper lid is joined to the upper end of the case. The electrolyte solution is injected into the case through the liquid inlet. Then, the liquid inlet is hermetically closed. The electrolyte solution is prepared by dissolving an electrolyte; lithium salt LiPF$_6$ at a concentration of about 1.0 mol/L in an organic solvent containing EC (ethylene carbonate), DMC (dimethyl carbonate), and EMC (ethylmethyl carbonate) at a weight ratio of 3:4:3. The electrolyte solution contains a mixture of the overcharge additive CHB and BP at a weight ratio of 1:2.5(%).

Examples 1 to 6

Examples 1 to 6 are produced in a similar manner to Example 1. Comparative example 6 is different from Example 1 in that the diameter of the secondary particles of the positive active material is set to about 3.5 μm and NV of the paste is set to about 58%.

Evaluation

About the non-aqueous electrolyte secondary batteries of Example 1 and Comparative examples 1 to 6 produced as above, initial resistance, cycle durability, and amount of gas generated during overcharge were evaluated. The conditions of the conditioning process in the examples are listed in the following Table 1 and their evaluation results are shown in the following Table 2. Herein, the resistance value is calculated based on a voltage drop after ten seconds from when each battery is discharged at a current rate of 20C with SOC 30%. A cycle test was carried out by repeating five hundreds time of charge and discharge at a temperature of 60° C., a voltage ranging from 3.0 to 4.1 V, and at a current rate of 2C, and the capacity retention rate was evaluated. The amount of gas generated during overcharge was measured by substituting fluorinated inert liquid (Fluorinert® of 3M Corporation) for the amount of overcharge gas generated when the battery was subjected to sweep from SOC 100% to SOC 145%, at a current rate of 1C, a temperature of 25° C.

tion amounts of overcharge gas (at initial stage and after the cycle endurance test), which are little different between at the initial stage and after the cycle endurance test. In contrast, Comparative examples 1 and 6 in which the steps 3 and 4 are skipped exhibit a largely decreased generation amount of overcharge gas especially after the cycle endurance test. This is conceivably because skipping the steps 3 and 4 results in that secondary particle fractures of the positive active material and contact failures with the conductive material are increased as the number of cycle endurance tests is increased, thus cutting off the conductive paths. In Comparative example 6, the generation amount of overcharge gas at the initial stage is large, whereas the capacity retention rate after the cycle endurance test and the generation amount of overcharge gas greatly decrease. It is thus found that even the reduced diameter of the secondary particles of the positive active material could not prevent deterioration due to the cycle endurance test.

In Comparative example 2, as compared with Example 1, the initial resistance value is high and the capacity retention rate after the cycle endurance test is low, and the overcharge gas generation amounts (at initial stage and after the cycle endurance test) are also small. This is conceivably because

TABLE 1

| | S2 | | S3 | | S4 | | S5 | |
|---|---|---|---|---|---|---|---|---|
| | Initial Charge Condition | Restraining Pressure [kPa] | Discharge Condition | Restraining Pressure [kPa] | Recharge Condition | Restraining Pressure [kPa] | Discharge Condition | Restraining Pressure [kPa] |
| Example 1 | 1 C-cc:4.1 (V) | 156 | 2 C-cc:2.0 (V) | 156 | 1 C-cc:4.45 (V) | 156 | 1 C-cc | 467 |
| Comparative Example 1 | ↑ | ↑ | — (End by Charge) | ↑ | — | ↑ | ↑ | ↑ |
| Comparative Example 2 | ↑ | ↑ | 2 C-cc:2.0 (V) | ↑ | — | ↑ | ↑ | ↑ |
| Comparative Example 3 | ↑ | ↑ | 2 C-cc:3.0 (V) | ↑ | 1 C-cc:4.45 (V) | ↑ | ↑ | ↑ |
| Comparative Example 4 | ↑ | ↑ | 1 C-cc:2.0 (V) | ↑ | ↑ | ↑ | ↑ | ↑ |
| Comparative Example 5 | ↑ | 467 | 1 C-cc:2.0 (V) | 467 | ↑ | 467 | ↑ | ↑ |
| Comparative Example 6 | ↑ | 156 | — (End by Charge) | 156 | — | 156 | ↑ | ↑ |

TABLE 2

| | IV Resistance [mΩ] | Overcharge gas generation amount (Initial stage) [cc/Ah] | Capacity Retention Rate after Cycle [%] | Overcharge gas generation amount (After endurance) [cc/Ah] |
|---|---|---|---|---|
| Example 1 | 34.6 | 89 | 86 | 86 |
| Comparative Example 1 | 39.7 | 68 | 72 | 43 |
| Comparative Example 2 | 38.4 | 72 | 78 | 69 |
| Comparative Example 3 | 39.8 | 65 | 71 | 51 |
| Comparative Example 4 | 38.2 | 67 | 72 | 48 |
| Comparative Example 5 | 39.2 | 78 | 81 | 73 |
| Comparative Example 6 | 37.6 | 92 | 68 | 37 |

As shown in Tables 1 and 2, Example 1 is lower in initial resistance value and higher in capacity retention rate after the cycle endurance test as compared with Comparative examples 1 to 6. Further, Example 1 exhibits lame generain Comparative example 2 skipping the step 4, the secondary particle fractures are generated but the conductive coating is not formed on the fracture portions. In Comparative example 3, the capacity retention rate after the cycle endurance test is equivalent to that in Comparative example 1 skipping the step 3. This is conceivably because in Comparative example 3, the voltage is not decreased to the overdischarge voltage of 2.0 V and thus the secondary particle fractures are not sufficiently generated. In Comparative example 4, the capacity retention rate after the cycle endurance test is equivalent to that in Comparative example 1 skipping the step 3. This is conceivably because in Comparative example 4, the current rate is set at 1C to slow the discharge speed in the step 3 and thus the secondary particle fractures are not sufficiently generated. In Comparative example 5, the initial resistance value, the capacity retention rate after the cycle endurance test and the overcharge gas generation amounts (at initial stage and after endurance) are increased more than in Comparative example 4. This is conceivably because in Comparative example 5, the restraining pressure is set to normal restraining pressure and thus expansion and contraction of the secondary particles entirely decrease.

From the above evaluation results, Example 1 is superior in each of the initial resistance value, the capacity retention rate after the cycle endurance test, and the overcharge gas generation amounts (at initial stage and after endurance) for the following reasons. In the conditioning process performed after production of the secondary battery, the secondary particle fracturing of the positive active material is induced purposely in advance, the conductivity is imparted to the fracture portions, so that the overcharge gas can be efficiently generated while the capacity degradation is suppressed even after the cycle endurance test.

<Operations and Effects>

As explained above in detail, the method for producing the non-aqueous electrolyte secondary battery 10 in the present embodiment includes the conditioning process in which the fracture portions 5 are formed in the secondary particles 2 of the positive active material after initial charge, so that the primary particles 1 having weak bonding force can be divided in advance by the fracture portion 5. Since the primary particles 1 are divided by the fracture portions 5, it is possible to reduce the influence of expansion and contraction during the cycle endurance test and suppress the possibility that causes contact failures between the conductive material 3 and the positive active material.

Since the fracture portions 5 are formed with the conductive coatings 4, it is possible to avoid a decrease in energy density caused by increasing a ratio of the conductive material 3 and also form a conductive path allowing electrical conduction from the fracture portions 5 to the negative active material through the conductive coatings 4, thereby enabling efficient generation of the overcharge gas. Furthermore, since the fracture portions 5 are formed in the secondary particles 2 of the positive active material, the size of the secondary particles 2 is miniaturized. This miniaturization is performed after initial charge. Thus, the size of the secondary particles 2 suitable for coating can be ensured without decreasing paste NV during coating. It is therefore possible to provide the method for producing the non-aqueous electrolyte secondary battery 10 capable of efficiently generating overcharge gas while suppressing capacity degradation even after the cycle endurance test.

According to the present embodiment, the fracture portions 5 are formed by setting the restraining pressure P to a lower pressure than the normal restraining pressure and by discharging at a high rate. This can prompt secondary particle fracturing by positively utilizing changes (expansion and contraction) in axial length of a crystal structure in association with the lithium absorption of the positive active material. Specifically, the restraining pressure P to be applied to the case 11 is set lower than the normal restraining pressure, so that the secondary particles 2 of the positive active material have a higher degree of freedom and are allowed to easily change (expand and contract) in crystal faces. Because of high-rate discharge, the plurality of primary particles forming each secondary particle rapidly change (expand and contract) in crystal faces. This is likely to cause fracturing from a crystal grain boundary between the primary particles having a weak bonding force.

Accordingly, in the conditioning process S2 to S5 performed after production of the secondary battery, the secondary particle fracturing of the positive active material is positively induced, dividing the primary particles from each other by the fracture portions 5, thereby making it possible to reduce the influence of expansion and contraction during the cycle endurance test and further suppressing the possibility of causing contact failures between the conductive material 3 and the positive active material. Herein, when the normal restraining pressure is set to on the order of 450 to 500 kPa, the restraining pressure is on the order of 30 to 40% of the normal restraining pressure. The discharge rate is on the order of 2C and alternatively may be 2C or higher.

According to the invention, the lowest potential during discharge is a potential equal to or lower than the lower limit potential in a normal use range, so that the lithium in the secondary particles 2 tends to be more absorbed than in normal discharge. As the lithium amount in the secondary particles 2 increases, fractures resulting from changes (expansion and contraction) in axial length of the crystal structure are more likely to occur. In the conditioning process performed after production of the secondary battery, therefore, the secondary particle fracturing of the positive active material can be effectively induced. Herein, the expansion and contraction amounts of the primary particles 1 are small at on the order of 3V which is the lower limit potential in the normal use range. Thus, the lowest potential during discharge is set to on the order of 2V which is about $2/3$ of the lower limit potential in the normal use range.

According to the present embodiment, the conductive coatings 4 are formed by setting the restraining pressure P to a lower pressure than the normal restraining pressure and recharge at a low rate, and also raising the upper limit potential during the recharge to a decomposition potential of the overcharge additive. This allows the electrolyte solution to go between the intrinsic surfaces of the fracture portions 5 generated by the secondary particle fracturing of the positive active material, forming a new conductive coating 4.

To be concrete, the restraining pressure P is set to a lower pressure than the normal restraining pressure. This can provide the gaps between the intrinsic surfaces of the fracture portions 5 generated by the secondary particle fracture, allowing the electrolyte solution containing the overcharge additive to get into the gaps. Further, because of recharge at a low rate, deterioration of the intrinsic surfaces can be prevented. The upper limit potential during recharge is raised up to the decomposition potential of the overcharge additive. This allows the component of the decomposed overcharge additive to easily come into close contact with the intrinsic surfaces and form the conductive coatings 4. In this case, since the conductive coatings 4 stick to the primary particles 1, the cycle durability is good. The conductive coatings 4 grow in the form of particles into porous coatings, and therefore they do not impede diffusion of the electrolyte solution. Further, the effective specific surface area (BET) including the intrinsic surfaces of the primary particles is high, thereby enabling reducing the battery resistance.

It is to be noted that each gap generated between the intrinsic surfaces of the fracture portions 5 is on the order of several hundreds nm, so that it is difficult for the conductive material 3 such as AB (acetylene black) continuous like beads on a string to get into the gaps. Simply increasing the amount of the conductive material 3 does not enable formation of conductive paths in the miniaturized and divided primary particles 1. Thus, the intrinsic surfaces of the fracture portions 5 generated by the secondary particle fracturing could not be effectively utilized.

Consequently, in the conditioning process S2 to S5 performed after production of the secondary battery, the conductivity derived from the decomposed overcharge additive is imparted to the fracture portions 5 generated by the secondary particle fracturing of the positive active material. This can more efficiently generate the overcharge gas while further suppressing capacity degradation even after the cycle endurance test.

According to the present embodiment, after the conductive coatings 4 are formed, the restraining pressure P is set to the normal restraining pressure and recharge at a low rate is performed. This can remove the gas generated when the surface coatings generally called SEI are formed on the negative active material surface and the gas generated during decomposition of the overcharge additive, and others. Since the gases are removed in the conditioning process performed after production of the secondary battery, the capacity retention rate after the cycle endurance test can be enhanced.

According to the present embodiment, the average particle diameter of the secondary particles 2 of the positive active material is 4 μm or more. This can suppress a decrease in capacity retention rate after the cycle endurance test in a secondary battery of a high energy density type having a less amount of the conductive material 3. Specifically, according to the experiments by the inventors, it is found that, as long as the average particle diameter of the secondary particles 2 is 4 μm or more, a conductive path can be formed even when the conductive material 3 (e.g., AB) is on the order of 6 weight %, and thus capacity retention rate after the cycle endurance test can be prevented from decreasing.

In another embodiment of the non-aqueous electrolyte secondary battery produced by the method for producing the non-aqueous electrolyte secondary battery of the present embodiment, the positive active material is ternary lithium oxide containing nickel, cobalt, and manganese. The conductive coatings 4 contain a component derived from cyclohexyl benzene or biphenyl. Accordingly, this embodiment can achieve a low-cost non-aqueous electrolyte secondary battery of high-energy density type having a less amount of the conductive material 3, the battery being capable of efficiently generating the overcharge gas while suppressing capacity degradation after the cycle endurance test.

The present invention is not limited to the above embodiment and may be embodied in other specific forms without departing from the essential characteristics thereof. For instance, the above embodiment uses, as the positive active material, the ternary lithium oxide (NCM) and has no limitation thereto. For instance, the positive active material may also be lithium cobalt oxide ($LiCoO_2$), lithium nickel oxide ($LiNiO_2$), lithium manganese oxide ($LiMn_2O_4$), and others. Lithium oxide that absorbs and releases lithium during charge and discharge is deteriorated due to expansion and contraction. As long as the secondary particle fracture is formed in advance to form the conductive coatings in the fracture portions, it is possible to efficiently generate the overcharge gas while suppressing capacity degradation even after the cycle endurance test.

INDUSTRIAL APPLICABILITY

The invention is applicable to a method for producing a non-aqueous electrolyte secondary battery to be mounted in an electric car, a hybrid car, etc. and the non-aqueous electrolyte secondary battery produced by the method.

REFERENCE SIGNS LIST

1 Primary particle
2 Secondary particle
3 Conductive material
4 Conductive coating
5 Fracture portion
10 Non-aqueous electrolyte secondary battery
11 Case
12 Positive terminal
13 Upper lid
14 Liquid inlet
15 Safety valve
16 Negative terminal
17 Restraining plate
18 Fastening tool

The invention claimed is:

1. A method for producing a non-aqueous electrolyte secondary battery, the method including: inserting an electrode group having a positive electrode and a negative electrode wound by interposing a separator therebetween into a case; injecting a non-aqueous electrolyte solution containing an overcharge additive and hermetically closing the case; and then performing a conditioning process to charge and discharge the battery at least once or more while applying restraining pressure to the case,
wherein the conditioning process includes:
subjecting the battery to an initial charge at lower restraining pressure than normal restraining pressure;
forming a fracture portion in secondary particles of a positive active material after the initial charge by performing overdischarge at a high rate and at a restraining pressure which is lower than the normal restraining pressure;
forming a conductive coating on an intrinsic surface of the fracture portion by, performing recharge at the restraining pressure lower than the normal restraining pressure and at a low rate, and raising an upper limit potential during the recharge to a decomposition potential of the overcharge additive, and
wherein the normal restraining pressure is in a range of 450 to 500 kPa, the high rate is 2C or higher, and the low rate is 1C.

2. The method for producing a non-aqueous electrolyte secondary battery according to claim 1, wherein, after the conductive coating is formed, the restraining pressure is set to the normal restraining pressure and redischarge is performed at the low rate.

3. The method for producing a non-aqueous electrolyte secondary battery according to claim 1, wherein the secondary particles of the positive active material has an average particle diameter of 4 μm or more.

* * * * *